US010208959B2

(12) United States Patent
Fanella et al.

(10) Patent No.: US 10,208,959 B2
(45) Date of Patent: Feb. 19, 2019

(54) FORGED FUEL INJECTOR STEM (71) Applicant: Solar Turbines Incorporated, San Diego, CA (US)

(72) Inventors: Robert James Fanella, San Diego, CA (US); Donald Lee Seybert, Lakeside, CA (US); Thomas John Chipman Rogers, San Diego, CA (US); Anthony Fahme, Chula Vista, CA (US)

(73) Assignee: Solar Turbines Incorporated, San Diego, CA (US)

( * ) Notice: Subject to any disclaimer, the term of this patent is extended or adjusted under 35 U.S.C. 154(b) by 504 days.

(21) Appl. No.: 15/058,141

(22) Filed: Mar. 1, 2016

(65) Prior Publication Data

US 2016/0175921 A1 Jun. 23, 2016

Related U.S. Application Data (62) Division of application No. 13/763,425, filed on Feb. 8, 2013, now Pat. No. 9,377,201.

(51) Int. Cl.
*B21K 3/00* (2006.01)
*F23R 3/34* (2006.01)
*F02C 7/22* (2006.01)
*B21D 53/84* (2006.01)
*B23P 15/00* (2006.01)

(52) U.S. Cl.
CPC .............. *F23R 3/343* (2013.01); *B21D 53/84* (2013.01); *B21K 3/00* (2013.01); *B23P 15/00* (2013.01); *F02C 7/222* (2013.01); *Y10T 29/49323* (2015.01)

(58) Field of Classification Search
CPC .......... F23R 3/343; B23P 15/00; B21D 53/84; F02C 7/222; B21K 3/00
See application file for complete search history.

(56) References Cited

U.S. PATENT DOCUMENTS

| 6,141,968 | A  | * | 11/2000 | Gates ................... F02C 7/222 |
| | | | | 239/423 |
| 7,497,012 | B2 | * | 3/2009 | Prociw .................. B23B 1/00 |
| | | | | 29/889.2 |
| 9,377,201 | B2 | * | 6/2016 | Fanella ................. F23R 3/343 |
| 2006/0130328 | A1 | * | 6/2006 | Prociw .................. B23B 1/00 |
| | | | | 29/890.01 |
| 2009/0255262 | A1 | | 10/2009 | McMasters et al. |

FOREIGN PATENT DOCUMENTS

CN    1542267    11/2004

* cited by examiner

*Primary Examiner* — Ryan J. Walters
(74) *Attorney, Agent, or Firm* — Procopio, Cory, Hargreaves & Savitch LLP (57) ABSTRACT A method for manufacturing a stem for a fuel injector of gas turbine engine includes forging a material into a unitary workpiece, which includes forging a top disk having a cylindrical shape, forging a body extending from a base of the top disk, and forging a lower disk connected to the body, distal to the top disk, the lower disk having a cylindrical shape oriented transverse to the top disk. The method further including machining the lower disk to form a gas gallery having a ring shape, and to define a gallery opening through the gas gallery, and machining a first fluid passage through the top disk, the body, and a portion of the gas gallery to the gallery opening, wherein the first fluid passage is in fluid communication with the gallery opening.

20 Claims, 8 Drawing Sheets

FORGED FUEL INJECTOR STEM

CROSS-REFERENCE TO RELATED APPLICATIONS

This application is a divisional application of U.S. application Ser. No. 13/763,425, filed on Feb. 8, 2013, the disclosure of which being hereby incorporated by reference in its entirety.

TECHNICAL FIELD

The present disclosure generally pertains to gas turbine engines, and is more particularly directed toward a fuel injector with a forged fuel injector stem.

BACKGROUND

Gas turbine engines include compressor, combustor, and turbine sections. The combustor section includes multiple fuel injectors. The fuel injectors include a stem with multiple pieces such as a stem bar, bar tubes, a gas gallery, and a flange.

U.S. Pat. No. 6,141,968 to Gates et al. discloses a stem member for a gas turbine fuel nozzle. The stem member for a gas turbine fuel nozzle includes inlet and outlet ends which are respectively adapted to be connected to a fuel adapter which is coupled to a fuel injector and a tip assembly having at least one spray orifice for atomizing fuel into a combustion chamber. The stem member further includes at least one slot which is sealed throughout the length thereof by a slot cover so as to define at least one fuel conduit for directing fuel flow from the inlet end to the outlet end of the stem member. An outer shield can be disposed outwardly of the stem member to protect and limit the transfer of heat from the surroundings to the stem member.

The present disclosure is directed toward overcoming one or more of the problems discovered by the inventors.

SUMMARY OF THE DISCLOSURE

A stem for a fuel injector of a gas turbine engine includes a single piece of material with a flange, a center body, a gas gallery, and a fluid passage. The flange includes a plurality of mounting holes and a handle hole. The flange includes a cylindrical shape. The center body extends from a cap of the flange in the axial direction of the flange. The gas gallery is adjacent the center body and distal to the flange. The gas gallery includes a ring shape oriented transverse to the flange. The gas gallery includes a gallery opening. The fluid passage extends through the flange, center body, and gas gallery. The fluid passage is in flow communication with the gallery opening.

A method for manufacturing a stem for a fuel injector of a gas turbine engine comprises forging a material into a unitary workpiece, including forging a top disk having a cylindrical shape, forging a body extending from a base of the top disk, and forging a lower disk connected to the body, distal to the top disk, the lower disk having a cylindrical shape oriented transverse to the top disk; machining the lower disk to form a gas gallery having a ring shape, and to define a gallery opening through the gas gallery; and machining a first fluid passage through the top disk, the body, and a portion of the gas gallery to the gallery opening, wherein the first fluid passage is in fluid communication with the gallery opening.

DETAILED DESCRIPTION

The systems and methods disclosed herein include a single body gas turbine engine fuel injector stem composed of a single piece of material. In embodiments, the single piece of material includes a flange, a center body, and a gas gallery. One or more fluid passages extend through the flange, the center body and a portion of the gas gallery. A single body fuel injector stem may reduce manufacturing time and costs. For example, manufacturing the fuel injector stem disclosed may not include brazing or other similar processes. A single body fuel injector stem may also increase durability of the fuel injector stem. The single body may reduce the effects of thermal expansion within the fuel injector stem.

Figure 1:
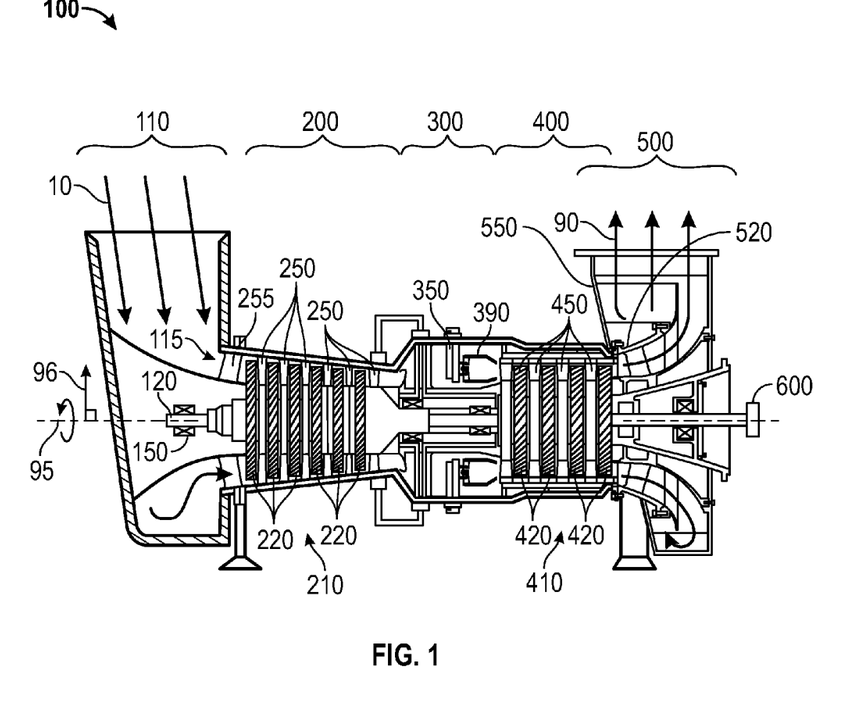
FIG. 1 is a schematic illustration of an exemplary gas turbine engine.

FIG. 1 is a schematic illustration of an exemplary gas turbine engine. Some of the surfaces have been left out or exaggerated (here and in other figures) for clarity and ease of explanation. Also, the disclosure may reference a forward and an aft direction. Generally, all references to "forward" and "aft" are associated with the flow direction of primary air (i.e., air used in the combustion process), unless specified otherwise. For example, forward is "upstream" relative to primary air flow, and aft is "downstream" relative to primary air flow.

In addition, the disclosure may generally reference a center axis 95 of rotation of the gas turbine engine, which may be generally defined by the longitudinal axis of its shaft 120 (supported by a plurality of bearing assemblies 150). The center axis 95 may be common to or shared with various other engine concentric components. All references to radial, axial, and circumferential directions and measures refer to center axis 95, unless specified otherwise, and terms such as "inner" and "outer" generally indicate a lesser or greater radial distance from, wherein a radial 96 may be in any direction perpendicular and radiating outward from center axis 95.

A gas turbine engine 100 includes an inlet 110, a shaft 120, a gas producer or compressor 200, a combustor 300, a turbine 400, an exhaust 500, and a power output coupling 600. The gas turbine engine 100 may have a single shaft or a dual shaft configuration.

The compressor 200 includes a compressor rotor assembly 210, compressor stationary vanes ("stators") 250, and inlet guide vanes 255. The compressor rotor assembly 210 mechanically couples to shaft 120. As illustrated, the compressor rotor assembly 210 is an axial flow rotor assembly.

The compressor rotor assembly 210 includes one or more compressor disk assemblies 220. Each compressor disk assembly 220 includes a compressor rotor disk that is circumferentially populated with compressor rotor blades. Stators 250 axially follow each of the compressor disk assemblies 220. Each compressor disk assembly 220 paired with the adjacent stators 250 that follow the compressor disk assembly 220 is considered a compressor stage. Compressor 200 includes multiple compressor stages. Inlet guide vanes 255 axially precede the first compressor stage.

The combustor 300 includes one or more injectors 350, each including a single body injector stem ("stem") 370 (shown in FIGS. 2-5) and one or more combustion chambers 390.

The turbine 400 includes a turbine rotor assembly 410, and turbine nozzles 450. The turbine rotor assembly 410 mechanically couples to the shaft 120. As illustrated, the turbine rotor assembly 410 is an axial flow rotor assembly. The turbine rotor assembly 410 includes one or more turbine disk assemblies 420. Each turbine disk assembly 420 includes a turbine disk that is circumferentially populated with turbine blades. Turbine nozzles 450 axially precede each of the turbine disk assemblies 420. Each turbine disk assembly 420 paired with the adjacent turbine nozzles 450 that precede the turbine disk assembly 420 is considered a turbine stage. Turbine 400 includes multiple turbine stages.

The exhaust 500 includes an exhaust diffuser 520 and an exhaust collector 550.

Figure 2:
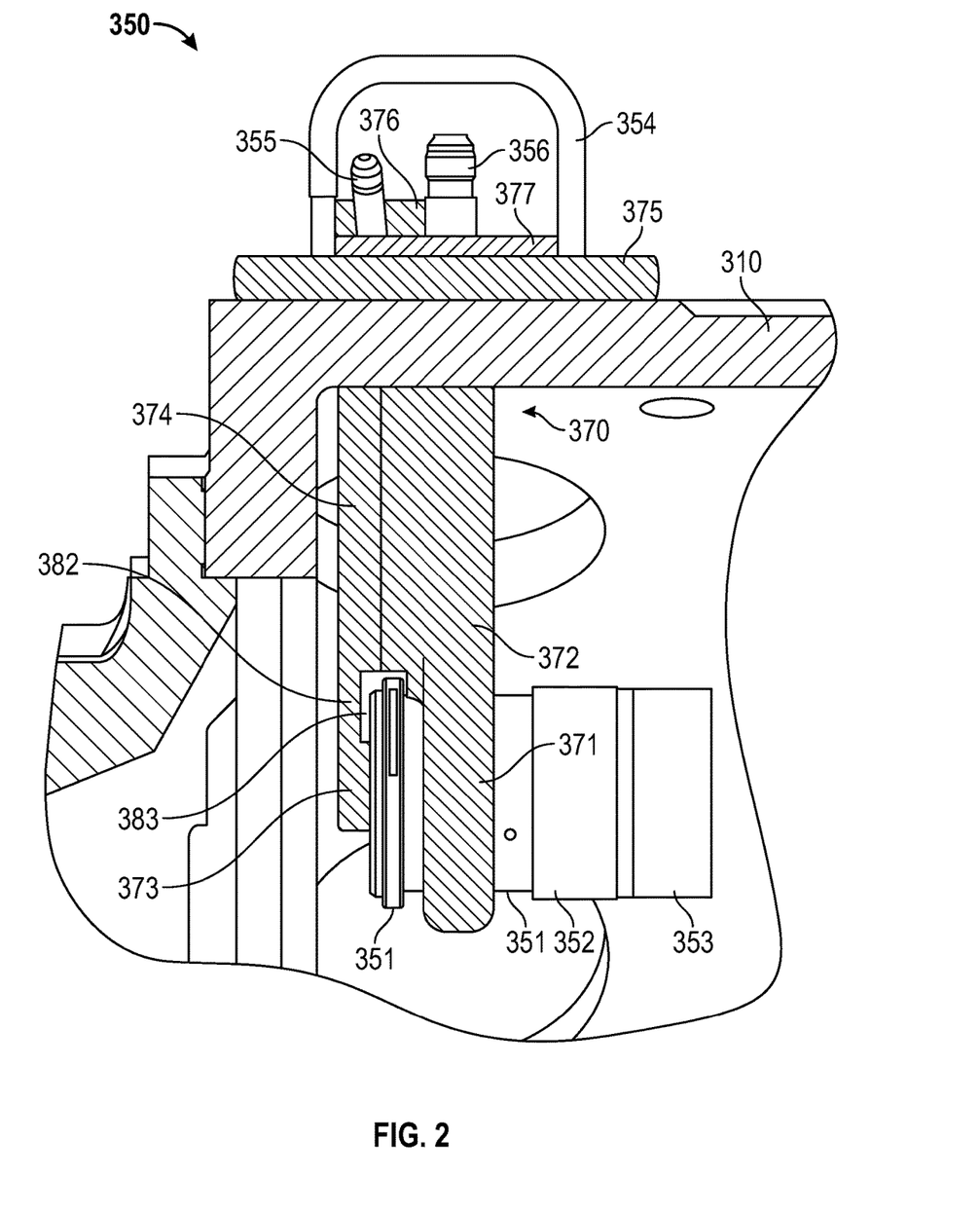
FIG. 2 is a cross sectional view of a portion of the combustor section of the gas turbine engine 100 of FIG. 1.

FIG. 2 is a cross sectional view of a portion of the combustor of the gas turbine engine 100 of FIG. 1. As illustrated in FIG. 2, case 310 surrounds the combustor. Injector 350 extends through case 310 and is fastened to case 310. Injector 350 includes stem 370, one or more handles 354, swirler assembly 351, and barrel 352. Stem 370 is a single integral piece of material that includes case mating flange ("flange") 375, center body 372, and gas gallery 371. Center body 372 extends from flange 375 to gas gallery 371.

Flange 375 fastens to case 310. Handle 354 may attach to flange 375. Swirler assembly 351 attaches to stem 370 at gas gallery 371. Swirler assembly 351 is in flow communication with stem 370. Swirler assembly 351 may attach to barrel 352 and may be in flow communication with barrel 352. Barrel 352 includes barrel end 353 which may be adjacent to the combustion chamber.

Figure 3:
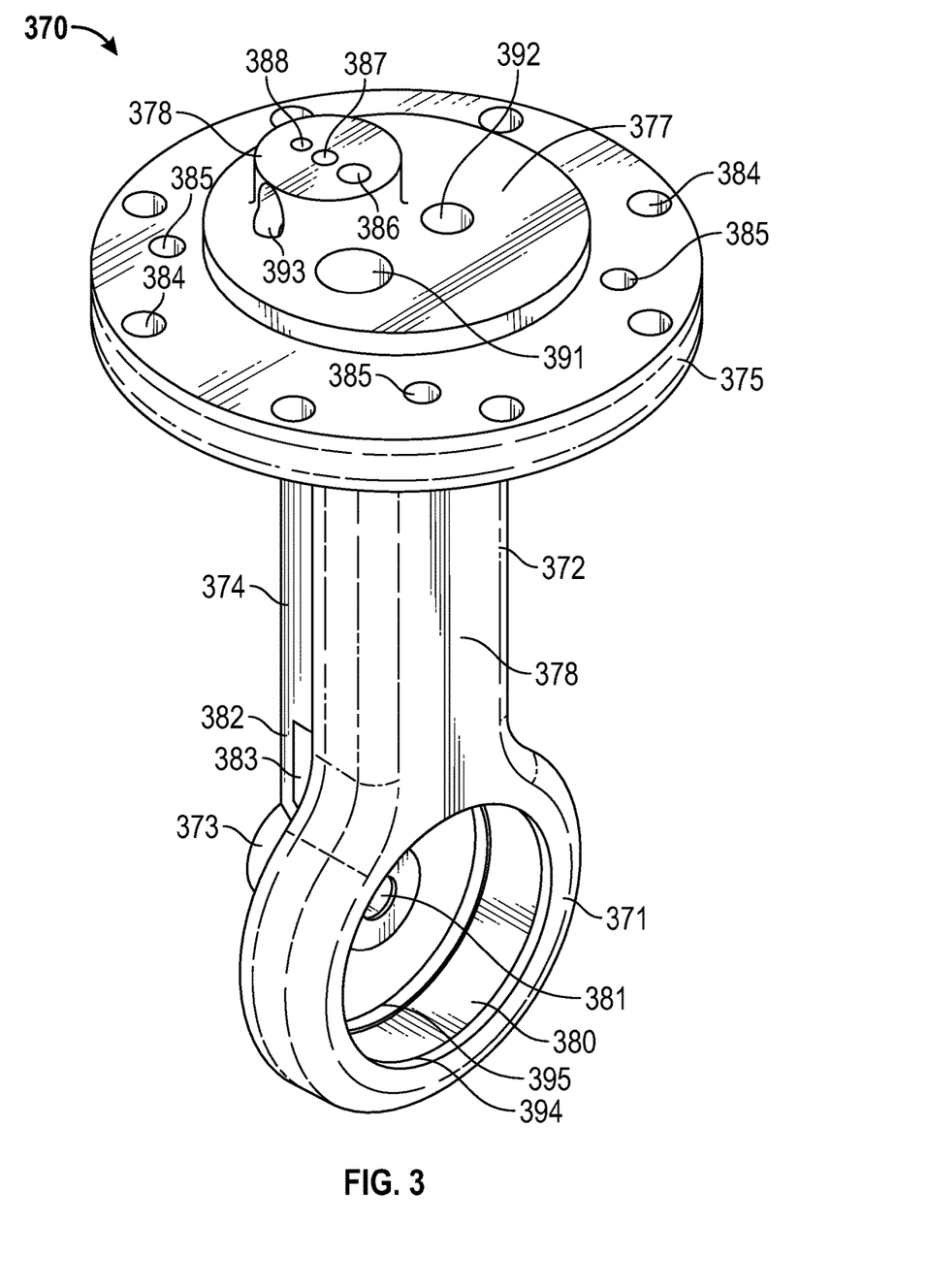
FIG. 3 is a perspective view of the fuel injector stem of FIG. 2.
Figure 4:
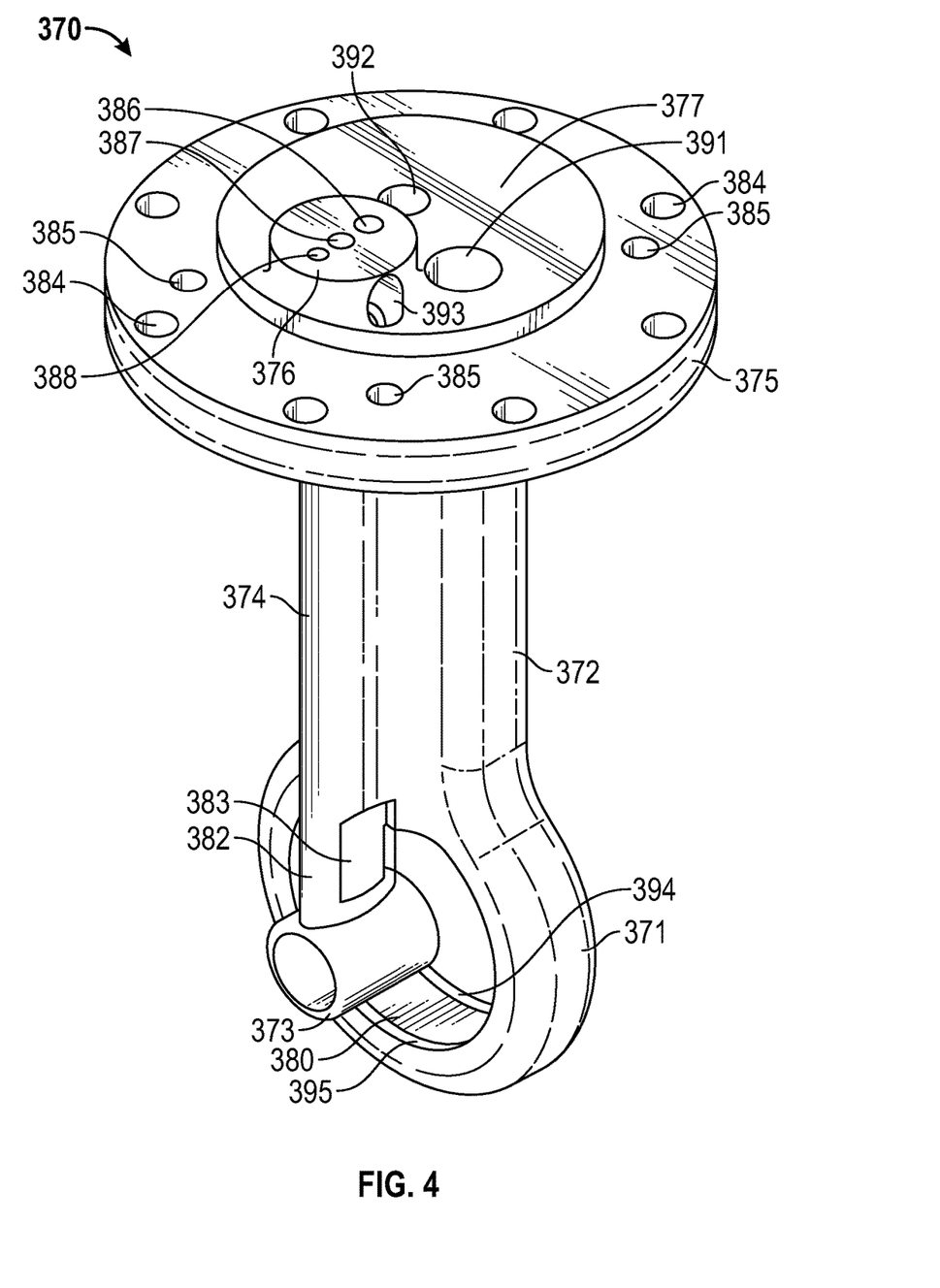
FIG. 4 is another perspective view of the fuel injector stem of FIG. 2.

FIG. 3 is a perspective view of stem 370 of FIG. 2. FIG. 4 is another perspective view of stem 370 of FIG. 2. Referring to FIGS. 2, 3, and 4, stem 370 may also include pilot body 374 and pilot funnel 373. Pilot body 374 extends from flange 375 along the back of center body 372, opposite stem front 378. Pilot body 374 may include strut 382 located adjacent gas gallery 371. Pilot funnel 373 may be cylindrical and is a located behind gas gallery 371. Gas gallery 371 includes gallery opening 380, which may be a cylindrical opening. The centers of pilot funnel 373 and gallery opening 380 may be aligned. Pilot funnel 373 may attach to pilot body 374 at strut 382. Strut 382 may extend across gallery opening 380 to pilot funnel 373. Strut 382 may include strut flats 383 on each side of strut 382. Strut flats 383 may be parallel surfaces that are inset from the outer surface of strut 382. Strut flats 383 and gallery opening 380 may facilitate connection of stem 370 to swirler assembly 351.

Stem 370 may also include fuel boss 377 and pilot boss 376. Fuel boss 377 may extend from flange 375 in the direction opposite center body 372. Pilot boss 376 may extend from fuel boss 377. In some embodiments, pilot boss 376 may extend directly from flange 375. One or more fittings, such as fittings 355 and 356 attach to stem 370 to provide fuel and fluids from a fuel or fluid source to injector 350.

Figure 5:
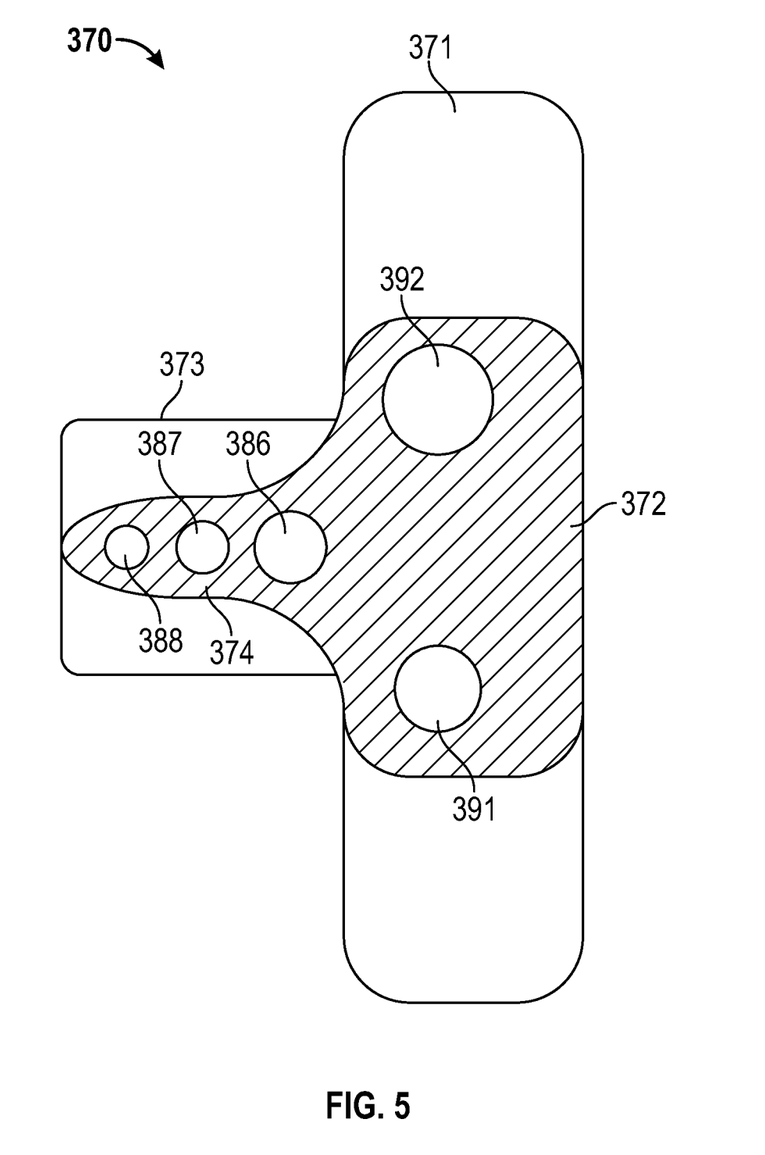
FIG. 5 is a cross sectional view through the center body and the pilot body of the fuel injector stem of FIGS. 2, 3, and 4.

FIG. 5 is a cross sectional view through the center body 372 and pilot body 374 of the stem 370 of FIGS. 2, 3, and 4. Referring now to FIGS. 3, 4, and 5 stem 370 may include gas main passage 391, liquid main passage 392, liquid pilot passage 386, gas pilot passage 387, and air assist passage 388. Gas main passage 391 and liquid main passage 392 may each start at fuel boss 377 and extend through flange 375, center body 372, and a portion of gas gallery 371 to gallery opening 380. In some embodiments, gas main passage 391 and liquid main passage 392 each start at flange 375.

Liquid pilot passage 386, gas pilot passage 387, and air assist passage 388 may each start at pilot boss 376 and extend through flange 375, pilot body 374, and a portion of pilot funnel 373 to pilot opening 381. In some embodiments, liquid pilot passage 386, gas pilot passage 387, or air assist passage 388 starts at fuel boss 377. In other embodiments, liquid pilot passage 386, gas pilot passage 387, or air assist passage 388 starts at flange 375. Pilot boss 376 may include fitting passage 393. Fitting passage 393 extends through the side of pilot boss 376 and connects to liquid pilot passage 386, gas pilot passage 387, or air assist passage 388. Fittings for liquid pilot passage 386, gas pilot passage 387, and air assist passage 388 may be too large to all connect directly to the passages at the top of pilot boss 376. Fitting passage 393 may facilitate connection of one of the fittings on the side of pilot boss 376, while the other fittings may connect at the top of pilot boss 376. In some embodiments, pilot boss 376 includes more than one fitting passage 393. Any of the fluid passages such as liquid pilot passage 386, gas pilot passage 387, and air assist passage 388 connected to fitting passage 393 may extend into pilot boss 376, may be capped above the fitting passage 393, and may not extend completely through pilot boss 376. While the embodiment shown in FIGS. 3-5 include the five fluid passages described above, stem 370 may include any number of fluid passages. In one embodiment, stem 370 includes a single fluid passage for liquid or gas fuel.

In the embodiment shown, center body 372 is an elongated solid with a rounded rectangle cross section. Gas gallery 371 is a ring shape with gallery opening 380 and rounded edges. In the embodiment shown, the ring shape of gas gallery 371 is a hollow cylinder. Gallery opening 380 is a circular opening. A front lip 394 extends from the cylindrical ring at the front cap/base of the cylindrical ring towards the center of gallery opening 380 and a back lip 395 from the cylindrical ring at the back cap of the cylindrical ring towards the center of gallery opening 380. In other embodiments, center body 372, gas gallery 371, and gallery opening 380 may have other shapes and cross sections.

In the embodiment shown, pilot body 374 extends out from center body 372 forming a T-shaped cross section. Pilot body 374 has an elliptical shape that rounds into center body 372. Strut 382 also includes an elliptical shape. In other embodiments, pilot body 374 and strut 382 may have other shapes and cross sections. Some embodiments may not include pilot body 374; strut 382 may extend directly from center body 372.

Referring to FIG. 5, the length or thickness of center body 372 and gas gallery 371 may be the same or similar relative to the axial direction of the cylindrical shape of gas gallery 371. Center body 372 and gas gallery 371 may also be aligned relative to the axial direction of gas gallery 371. Pilot body 374 and pilot funnel 373 may have the same or similar length relative to the axial direction of gas gallery 371 and be aligned relative to the same axial direction.

In the embodiment shown, stem 370 is a single integral piece that includes center body 372, pilot body 374, strut 382, gas gallery 371, pilot funnel 373, flange 375, pilot boss 376, and fuel boss 377. Some embodiments may not include pilot body 374, pilot funnel 373, pilot boss 376, or fuel boss 377.

Referring again to FIG. 2, swirler assembly 351 may be surrounded by and fit into gas gallery 371. Swirler assembly may abut pilot funnel 373. The connection between the stem 370 including the gas gallery 371 and the pilot funnel 373 with the mating pieces including the swirler assembly 351 may keep the fluids segregated as the fluids exit the stem 370 and may only allow the fluids to mix at the fluid injection points.

Figure 6:
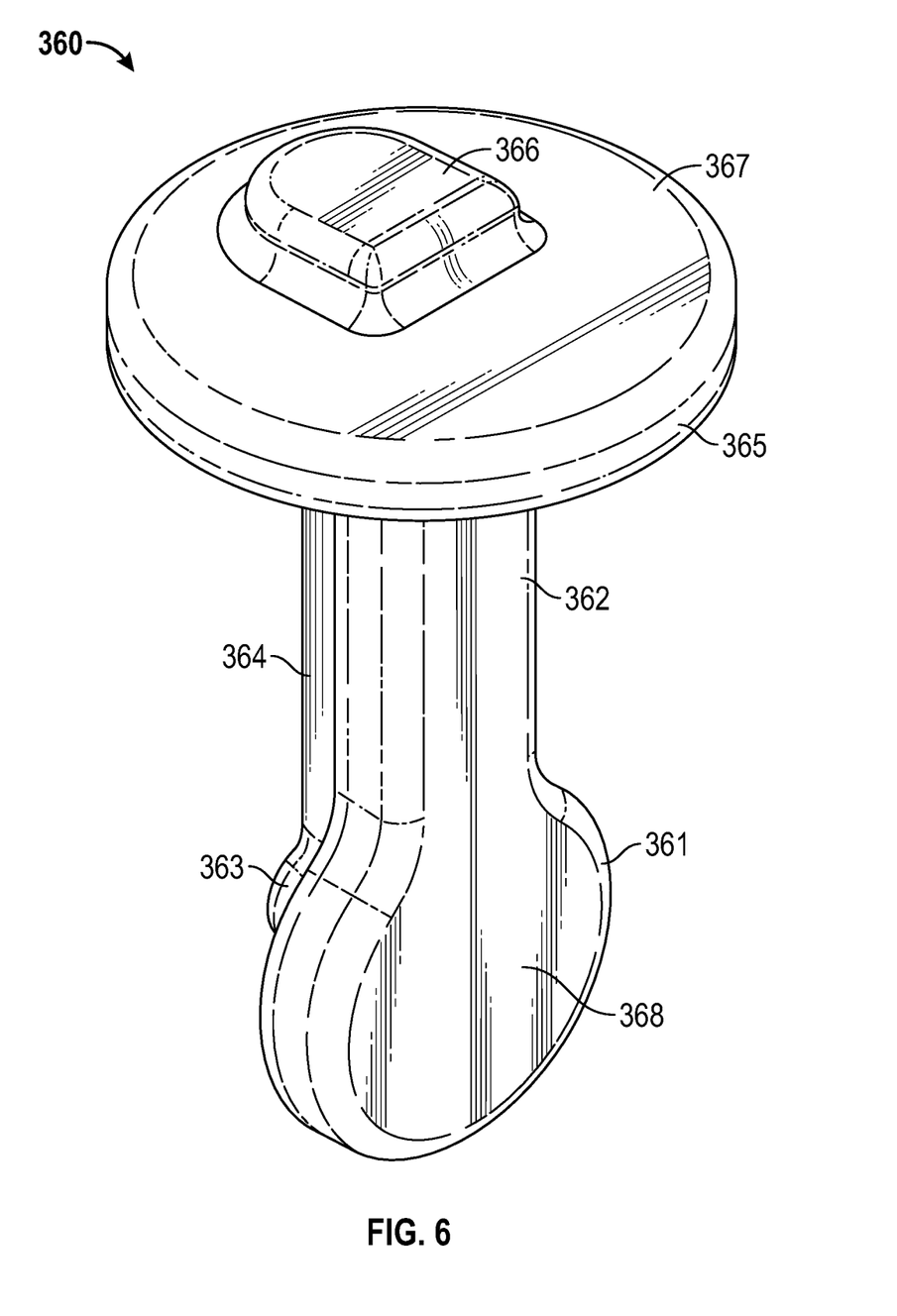
FIG. 6 is a perspective view of a forged workpiece used in the manufacture of the fuel injector stem of FIGS. 2-5.
Figure 7:
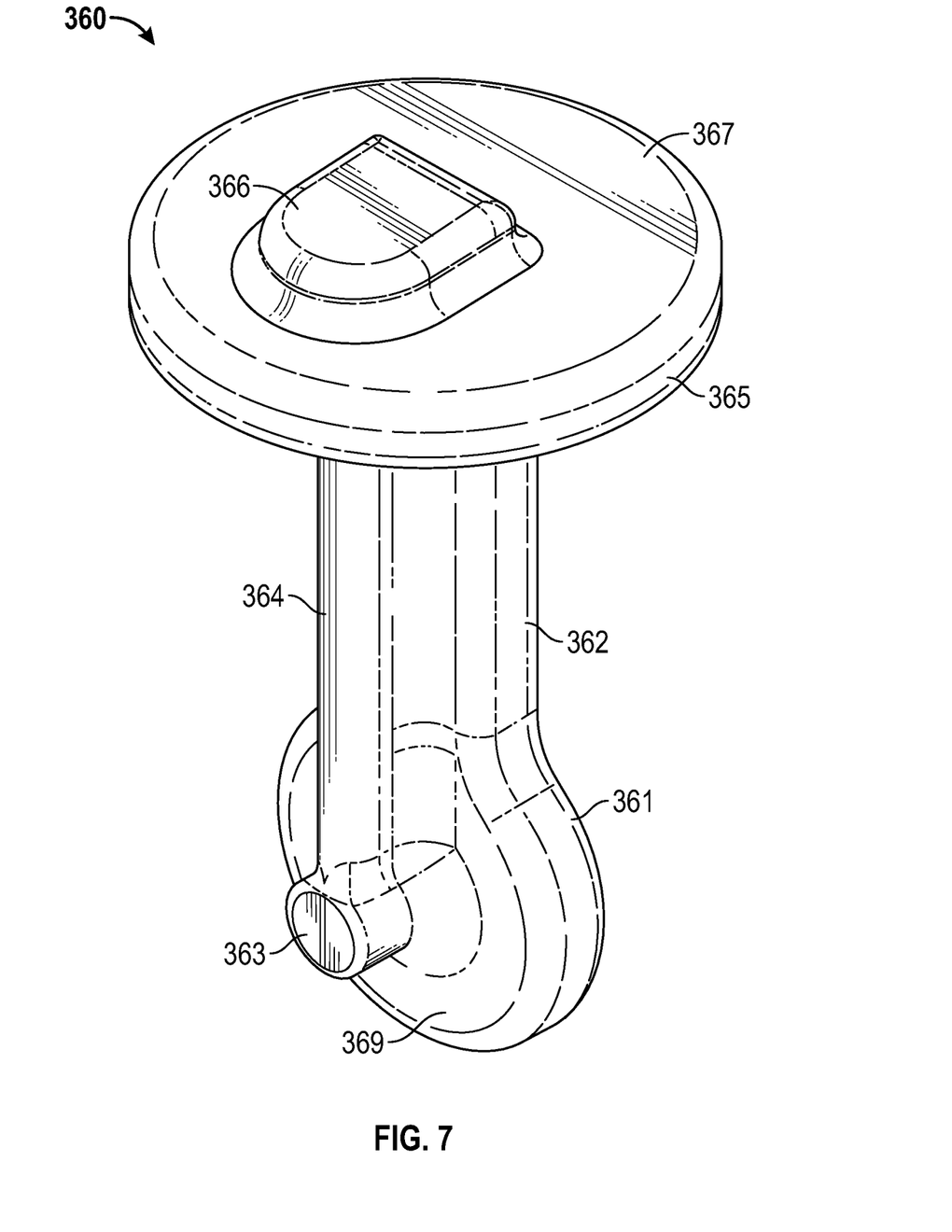
FIG. 7 is another perspective view of the forged workpiece of FIG. 6.

FIG. 6 is a perspective view of a forged workpiece 360 used in the manufacture of stem 370 of FIGS. 2-5. FIG. 7 is another perspective view of forged workpiece 360. Forged workpiece ("workpiece") 360 includes top disk 365, body 362, and lower disk 361. Top disk 365 is a cylindrical shape. Top disk 365 may include tapered portion 367 where the radius of a portion of top disk 365 reduces like a conical frustum.

Body 362 extends from a cap of the cylindrical shape of top disk 365. Body 362 may be a cuboid extending perpendicular to the cap it extends from. In one embodiment, the edges of the cuboid are rounded. Lower disk 361 is located adjacent body 362, distal to top disk 365. Lower disk 361 is a cylindrical shape. Lower disk 361 is oriented transverse or crosswise to top disk 365. The thickness of lower disk 361 may be the same or similar to the thickness of body 362. In one embodiment, the edges of the cylindrical shape of lower disk 361 are rounded. One side of body 362 may align with a cap of lower disk 361 to form a workpiece front 368. The opposite side of body 362 may align with the opposite cap of lower disk 361 to form a workpiece back 369.

Workpiece 360 may also include top protrusion 366, cylindrical protrusion 363, and body protrusion 364. Top protrusion 366 extends out from top disk 365 in a direction opposite body 362. In the embodiment shown, top protrusion 366 is a solid with an extended half round cross section. In other embodiments, top protrusion 366 may be a cylinder, a cuboid, or other solid shapes. The edges and corners of top protrusion 366 may be rounded. Top protrusion 366 may be offset from the center of top disk 365.

Cylindrical protrusion 363 extends from lower disk 361 in the axial direction of lower disk 361 with a cylindrical shape. Cylindrical protrusion 363 may extend from the workpiece back 369. Cylindrical protrusion 363 has a smaller radius than lower disk 361. The axis of cylindrical protrusion 363 may align with the axis of lower disk 361. The edges of cylindrical protrusion 363 and the corners between cylindrical protrusion 363 and lower disk 361 may be rounded.

Body protrusion 364 extends out from body 362. Body protrusion 364 may extend from the workpiece back 369. A portion of body protrusion 364 may extend out from lower disk 361. Body protrusion 364 may extend in a radial direction of top disk 365 and may extend out to align with top protrusion 366 in the axial direction of top disk 365. Body protrusion 364 may run from top disk 365 to cylindrical protrusion 363. Cylindrical protrusion 363 may be a cuboid, a triangular prism, or a solid with an extended half round or elliptical cross section.

One or more of the above components (or their subcomponents) may be made from stainless steel and/or durable, high temperature materials known as "superalloys". A superalloy, or high-performance alloy, is an alloy that exhibits excellent mechanical strength and creep resistance at high temperatures, good surface stability, and corrosion and oxidation resistance. Superalloys may include materials such as HASTELLOY, INCONEL, WASPALOY, RENE alloys, HAYNES alloys, INCOLOY, MP98T, TMS alloys, and CMSX single crystal alloys. In one embodiment, stem 370 is made from a low carbon stainless steel such as 316L.

INDUSTRIAL APPLICABILITY

Gas turbine engines may be suited for any number of industrial applications such as various aspects of the oil and gas industry (including transmission, gathering, storage, withdrawal, and lifting of oil and natural gas), the power generation industry, cogeneration, aerospace, and other transportation industries.

Referring to FIG. 1, a gas (typically air 10) enters the inlet 110 as a "working fluid", and is compressed by the compressor 200. In the compressor 200, the working fluid is compressed in an annular flow path 115 by the series of compressor disk assemblies 220. In particular, the air 10 is compressed in numbered "stages", the stages being associated with each compressor disk assembly 220. For example, "4th stage air" may be associated with the 4th compressor disk assembly 220 in the downstream or "aft" direction, going from the inlet 110 towards the exhaust 500). Likewise, each turbine disk assembly 420 may be associated with a numbered stage.

Once compressed air 10 leaves the compressor 200, it enters the combustor 300, where it is diffused and fuel is added. Referring to FIG. 2, fuel is supplied to the combustor via supply lines that are connected to fittings, such as fittings 355 and 356. Either a gas fuel or liquid fuel is supplied to gas main passage 391 or liquid main passage 392 respectively. Fuel and air 10 may be swirled/mixed in swirler assembly 351 and pass into barrel 352 that injects the air 10 and fuel mixture into the combustion chamber 390. The air 10 and fuel mixture is combusted in the combustion chamber 390. Energy is extracted from the combustion reaction via the turbine 400 by each stage of the series of turbine disk assemblies 420. Exhaust gas 90 may then be diffused in exhaust diffuser 520, collected and redirected. Exhaust gas 90 exits the system via an exhaust collector 550 and may be further processed (e.g., to reduce harmful emissions, and/or to recover heat from the exhaust gas 90).

Injectors 350 and in particular injector stems may be complex and expensive to manufacture. Injector stems may include multiple pieces such as a gas gallery, a stem bar, multiple bar tubes, and a flange. The separate injector stem parts may be brazed together, often in several braze cycles. These contacts between injector stem parts may be affected by the thermal growth of the separate parts.

Stem 370 is forged and machined and integrates the various parts of an injector stem into a single piece, which may reduce the complexity and the manufacturing cost. Stem 370 may not need any brazing and may reduce the overall assembly time of injectors 350. The single piece of stem 370 may reduce the effects of thermal growth.

Figure 8:
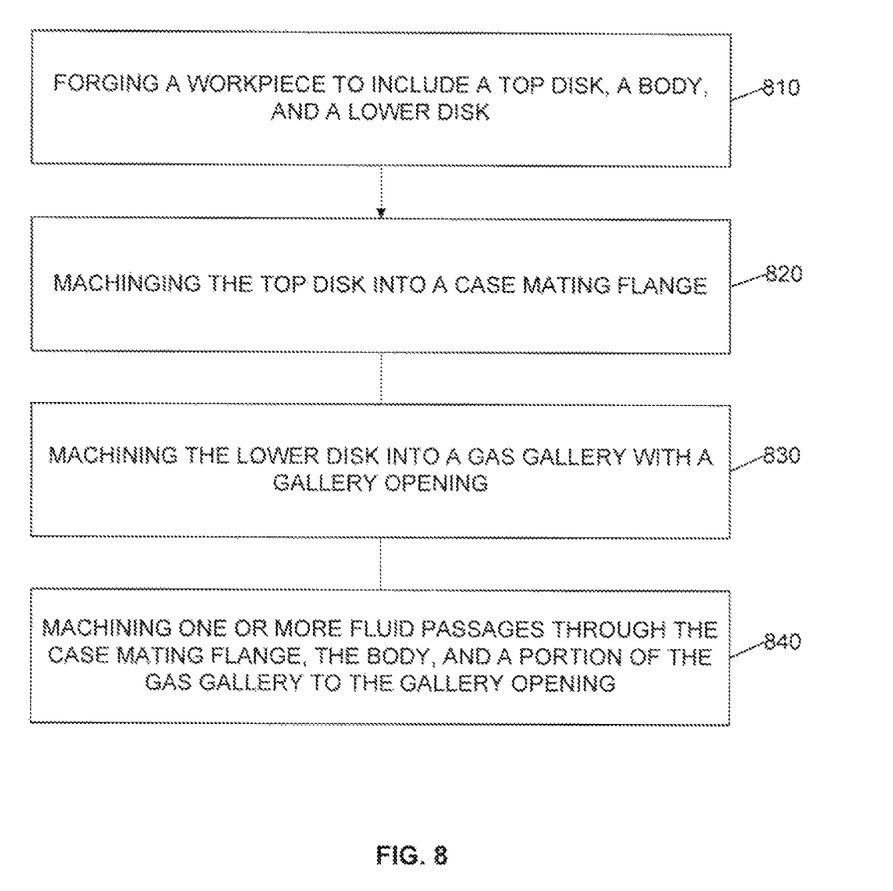
FIG. 8 is a flowchart of a method for manufacturing the fuel injector stem of FIGS. 2-5.

FIG. 8 is a flowchart of a method for manufacturing stem 370 of FIGS. 2-5. Referring to FIGS. 6 and 7, the method includes forging workpiece 360 to include top disk 365, body 362, and lower disk 361 at step 810. In some embodiments, step 810 also includes forging workpiece 360 to include top protrusion 366, cylindrical protrusion 363, and body protrusion 364.

Referring to FIGS. 3, 4, 6, and 7, step 810 is followed by machining top disk 365 into flange 375 at step 820. Step 820 may include machining mounting holes 384 about flange 375 and machining handle holes 385. In the embodiment shown in FIGS. 3 and 4, flange 375 includes eight mounting holes 384 and four handle holes 385.

Step 810 is followed by machining lower disk 361 into gas gallery 371 at step 830. Step 830 may include forming the ring shape of gas gallery 371 by removing material for gallery opening 380. Step 830 may also include forming front lip 394 and back lip 395.

Step 810 is also followed by machining one or more fluid passages through flange 375, body 362 or center body 372, and a portion of gas gallery 371 to gallery opening 380 at step 840. In the embodiment shown in FIGS. 3 and 4, the passages machined include gas main passage 391 and liquid main passage 392. Gas pilot, liquid pilot, and air assist passages may also be included.

Step 810 may be followed by machining body 362 into center body 372. In some embodiments, body 362 may be forged into the shape of center body 372; in these embodiments no machining may be necessary to form the shape of center body 372.

Step 810 may also be followed by machining top protrusion 366 into pilot boss 376, machining cylindrical protrusion 363 into pilot funnel 373, and machining body protrusion 364 into pilot body 374. Machining top protrusion 366 into pilot boss 376 may include machining the cylindrical shape of pilot boss 376 and machining liquid pilot passage 386, gas pilot passage 387, and air assist passage 388 through pilot boss 376. Fitting passage 393 may also be machined into pilot boss 376 and connected to one of the passages.

Machining cylindrical protrusion 363 into pilot funnel 373 may include machining the cylindrical shape of pilot funnel 373 and machining pilot opening 381. Pilot opening 381 may extend into pilot funnel 373 to where liquid pilot passage 386, gas pilot passage 387, and air assist passage 388 may connect to pilot funnel 373.

Machining body protrusion 364 into pilot body 374 may include machining pilot body 374 into a solid with an elliptical cross section that rounds into cuboid shape of center body 372, machining strut 382, which extends into gallery opening 380, and machining strut opening 383. Machining body protrusion 364 into pilot body 374 may also include machining liquid pilot passage 386, gas pilot passage 387, and air assist passage 388 through pilot body 374 to pilot opening 381.

Forging the workpiece 360 may be performed by forging processes such as precision forging or die forging. Machining workpiece 360 into stem 370 may be performed by machining processes such as CNC Turning (CNC Lathe) Manual Turning (Engine Lathe), CNC 3 Axis Milling, 5 Axis Milling, Mill Turn Machining, and Electric Discharge Machining (EDM).

It is understood that the steps disclosed herein (or parts thereof) may be performed in the order presented or out of the order presented, unless specified otherwise. For example, machining top disk 365 into flange 375 may be performed before or after machining lower disk 361 into gas gallery 371.

The preceding detailed description is merely exemplary in nature and is not intended to limit the invention or the application and uses of the invention. The described embodiments are not limited to use in conjunction with a particular type of gas turbine engine. Hence, although the present disclosure, for convenience of explanation, depicts and describes a particular fuel injector and fuel injector stem, it will be appreciated that the fuel injector and fuel injector stem in accordance with this disclosure can be implemented in various other configurations, can be used with various other types of gas turbine engines, and can be used in other types of machines. Furthermore, there is no intention to be bound by any theory presented in the preceding background or detailed description. It is also understood that the illustrations may include exaggerated dimensions to better illustrate the referenced items shown, and are not consider limiting unless expressly stated as such.

What is claimed is:

1. A method for manufacturing a stem for a fuel injector of gas turbine engine, the method comprising:
    forging a material into a unitary workpiece, including
        forging a top disk having a cylindrical shape,
        forging a body extending from a base of the top disk, and
        forging a lower disk connected to the body, distal to the top disk, the lower disk having a cylindrical shape oriented transverse to the top disk;
    machining the lower disk to form a gas gallery having a ring shape, and to define a gallery opening through the gas gallery; and
    machining a first fluid passage through the top disk, the body, and a portion of the gas gallery to the gallery opening, wherein the first fluid passage is in fluid communication with the gallery opening.

2. The method of claim 1, further comprising machining the top disk into a flange defining a plurality of mounting holes and a handle hole.

3. The method of claim 1, further comprising machining the body into a center body having a solid shape with a rounded rectangle cross section.

4. The method of claim 1, wherein the forging the material into the unitary workpiece further includes forging a body protrusion that extends from the body along an aft direction of the stem, the aft direction of the stem being transverse to a longitudinal axis of the top disk, the body and the body protrusion forming a T-shaped cross section.

5. The method of claim 4, wherein the forging the material into the unitary workpiece further includes forging a cylindrical protrusion that extends from the lower disk in the aft direction, the cylindrical protrusion including a cylindrical shape, a radius of the cylindrical shape being smaller than a radius of the lower disk.

6. The method of claim 5, wherein a longitudinal axis of the cylindrical protrusion is aligned with a longitudinal axis of the lower disk.

7. The method of claim 5, further comprising machining the cylindrical portion into a pilot funnel, the pilot funnel having a hollow cylinder shape that defines a pilot opening.

8. The method of claim 7, wherein the fluid passage is a gaseous fuel main passage,
    the method further comprising machining a gaseous fuel pilot passage through the top disk, the body protrusion, and the pilot funnel to the pilot opening, wherein the gaseous fuel pilot passage is in fluid communication with the pilot opening.

9. The method of claim 7, wherein the fluid passage is a liquid fuel main passage,
    the method further comprising machining a liquid fuel pilot passage through the top disk, the body protrusion, and the pilot funnel to the pilot opening, wherein the liquid fuel pilot passage is in fluid communication with the pilot opening.

10. The method of claim 9, further comprising machining an air assist passage through the top disk, the body protrusion, and the pilot funnel to the pilot opening, wherein the air assist passage is in fluid communication with the pilot opening.

11. The method of claim 7, further comprising:
    machining a second fluid passage through the top disk, the body, and the gas gallery to the gallery opening, wherein the second fluid passage is in fluid communication with the gallery opening;
    machining a third fluid passage through the top disk, the body protrusion, and the pilot funnel to the pilot opening, wherein the third fluid passage is in fluid communication with the pilot opening;
    machining a fourth fluid passage through the top disk, the body protrusion, and the pilot funnel to the pilot opening, wherein the fourth fluid passage is in fluid communication with the pilot opening.

12. The method of claim 11, wherein the first fluid passage is a gaseous fuel main passage,
    the second fluid passage is a liquid fuel main passage,
    the third fluid passage is a gaseous fuel pilot passage, and
    the fourth fluid passage is a liquid fuel pilot passage.

13. The method of claim 11, further comprising machining a fifth fluid passage through the top disk, the body protrusion, and the pilot funnel to the pilot opening, wherein the fifth fluid passage is in fluid communication with the pilot opening.

14. The method of claim 13, wherein the first fluid passage is a gaseous fuel main passage,
    the second fluid passage is a liquid fuel main passage,
    the third fluid passage is a gaseous fuel pilot passage,
    the fourth fluid passage is a liquid fuel pilot passage, and
    the fifth fluid passage is an air assist passage.

15. The method of claim 4, wherein the forging the material into the unitary workpiece further includes forging a top protrusion that extends from the top disk in a direction opposite the body,
    the method further comprising machining the top protrusion into a pilot boss having a cylindrical shape.

16. The method of claim 4, further comprising machining the body protrusion into a pilot body that extends from the center body along the aft direction, such that the pilot body and the center body form a T-shaped cross section.

17. The method of claim 1, further comprising machining a second fluid passage through the top disk, the body, and the portion of the gas gallery to the gallery opening, wherein the second fluid passage is in fluid communication with the gallery opening.

18. The method of claim 17, wherein the first fluid passage is a gaseous fuel main passage and the second fluid passage is a liquid fuel main passage.

19. The method of claim 1, further comprising machining the body into a center body having a solid shape with a rounded cross section,
    wherein a thickness of the gas gallery matches and aligns with a thickness of the center body along a direction parallel to a longitudinal axis of the gas gallery.

20. The method of claim 1, wherein the forging the material into a unitary workpiece does not include any brazing.

* * * * *